United States Patent [19]
Golembeski

[11] 3,875,210
[45] Apr. 1, 1975

[54] ALUMINUM POWDER AS AN ESTERIFICATION CATALYST

[75] Inventor: Ronald J. Golembeski, Corapolis, Moon Township, Allegheny County, Pa.

[73] Assignee: United States Steel Corporation, Pittsburgh, Pa.

[22] Filed: May 14, 1973

[21] Appl. No.: 359,942

[52] U.S. Cl. .......................... 260/475 R, 260/485 R
[51] Int. Cl. ....................... C07c 69/60, C07c 69/80
[58] Field of Search ..................... 260/475 R, 485 R

[56] References Cited
FOREIGN PATENTS OR APPLICATIONS
733,870  7/1955  United Kingdom ............. 260/475 R
174,450  8/1947  Japan

*Primary Examiner*—Lorraine A. Weinberger
*Assistant Examiner*—E. Jane Skelly
*Attorney, Agent, or Firm*—William L. Krayer

[57] ABSTRACT

The esterification of certain anhydrides with alcohols is accomplished in the presence of aluminum powder catalyst.

5 Claims, No Drawings

ALUMINUM POWDER AS AN ESTERIFICATION CATALYST

BACKGROUND OF THE INVENTION

It has been common practice in the plastics industry to prepare plasticizers for such plastics as polyvinyl chloride by the esterification of, for example, phthalic anhydride with a lower alcohol. Such compounds must be treated with activated carbon or in some other manner to remove the color which is undesirable in the final plastic product. This extra step is costly and far from desirable.

It has been known prior to the present invention to use aluminum chloride in the process of preparing esters by the reaction of organic hydroxy compounds having at least six carbon atoms with a carboxylic acid halide. See U.S. Pat. No. 2,345,006. It is also known to be beneficial to prepare relatively pure alcohols for use in this reaction by treating them with a metal borohydride, which treatment may also take place in the presence of a polyvalent metal halide. See U.S. Pat. No. 2,867,651. The purification of an alcohol for use in an esterification reaction is also disclosed in U.S. Pat. No. 3,065,258. This purification of the alcohol is accomplished in the presence of an alkali metal aluminum hydride. Lewis acids are also used for a similar purpose as discussed in U.S. Pat. No. 3,373,211.

The catalytic activity of titanium peroxide is compared with the catalytic activity of a composition of sulfuric acid and aluminum sulfate in U.S. Pat. No. 3,459,736. Aluminum hydroxide has also been used as a catalyst, as shown in British Patent No. 733,870. See also Czechoslovakian Patent No. 120,758, in which aluminum oxide is said to be inferior to antimony oxide. Esterification of phthalic anhydride has been attempted in the vapor phase in the presence of aluminum oxide gels—see Volume 49 of *Chemical Abstracts* 14, 16B (1955).

In U.S. Pat. No. 3,194,791 it is said that aluminum metal has been used as an ester interchange catalyst. It has also been disclosed, in Japanese Patent No. 174,450 that aluminum powder may be used in an esterification process by heating an organic acid and a slight excess of a higher alcohol wherein the aluminum powder is present in a concentration of from 3 to 7 percent.

SUMMARY OF THE INVENTION

I have invented a method of making plasticizers for use in manufacturing polyvinyl chloride films which are colorless without the necessity of activated carbon or other treatment to remove color bodies. The elimination of the color removal steps from the manufacturing process also eliminates a waste removal problem.

I have found that certain anhydrides of dicarboxylic acids such as phthalic anhydride, maleic anhydride, and pyromellitic dianhydride, may be reacted with lower alcohols (simple alcohols having one hydroxyl group and from 4 to 13 carbon atoms) to form esters useful in the manufacture of plastics and coatings.

My invention requires the use of powdered aluminum in amounts ranging from about 0.01 to about 0.5 percent of aluminum based upon the phthalic or other anhydrides.

The aluminum is preferably in the form of finely divided metal having a mesh size of from 100 to 200, and should be used in the presence of alkali metal hydroxide solution in a weight ratio of aluminum to alkali metal hydroxide of from about 1:1 to about 9:1.

It is believed that the destruction of color bodies is accomplished during the evolution of hydrogen from the reaction mass while aluminum is combining with the anhydride. While I do not intend to be bound by any theories, I believe the color of the product is destroyed by an alkali metal-aluminum complex.

My reaction requires that the molar proportions of alcohol to anhydride compound should preferably be from about 2.0:1 to about 2.5:1.

Preferred temperature for the reaction is the reflux temperature of the alcohol. However, the temperature is not critical, and generally temperatures in the range of 190° to 200°C will provide efficient reactions. Pressures may range from atmospheric to 15 psig.

The following example demonstrates my invention.

EXAMPLE 1

Reaction performed in a 1-liter-three-necked flask, fitted with stirrer, thermometer and Dean-Start. Contents of mixture:

148 g phthalic anhydride
392 g 2-ethyl hexyl alcohol
0.4 g aluminum powder
3.0 g 50 percent sodium hydroxide The mixture was refluxed at 200°C and the following results were obtained. After one hour at 200°C, the conversion was 85 percent diester; after two hours, 95.5 percent diester; and after 3 hours, 97.4 percent diester, and the product was colorless. Hydrogen was evolved. A comparative experiment was conducted without aluminum powder and sodium hydroxide under the same conditions and resulted in only 90 percent conversion diester after four hours and the product had a yellow color.

I claim:

1. Method of reacting an anhydride of a dicarboxylic acid with a lower alcohol having one hydroxyl group and from 4 to 13 carbon atoms to obtain an ester, comprising reacting the anhydride and the alcohol in the presence of an aluminum powder catalyst and an alkali metal hydroxide.

2. Method of claim 1 in which the aluminum powder is present in an amount from 0.01 to 0.5 percent based upon the weight of the anhydride.

3. Method of claim 1 in which the anhydride is phthalic anhydride.

4. Method of claim 1 in which the ratio of aluminum to alkali metal hydroxide is from about 1:1 to about 9:1.

5. Method of claim 1 in which the reaction is conducted at a temperature of from about 190°C to about 200°C.

* * * * *